United States Patent
Kato

(10) Patent No.: US 6,783,288 B2
(45) Date of Patent: Aug. 31, 2004

(54) PRINT CONTROL OF A PRINT JOB TO BE PRINTED TO A PLURALITY OF PRINTERS

(75) Inventor: Kazunori Kato, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 10/188,760

(22) Filed: Jul. 5, 2002

(65) Prior Publication Data

US 2003/0007818 A1 Jan. 9, 2003

(30) Foreign Application Priority Data

Jul. 6, 2001 (JP) .................................... 2001-206916

(51) Int. Cl.[7] .............................. B41J 5/30; B41J 21/17; G06F 15/00; G06K 15/00
(52) U.S. Cl. .............................. 400/61; 400/70; 400/76; 101/484; 358/1.1; 358/1.13; 358/1.15; 358/1.18
(58) Field of Search .............................. 400/61, 70, 76; 101/484; 358/1.15, 1.18, 1.1, 1.13

(56) References Cited

U.S. PATENT DOCUMENTS

| | | | | |
|---|---|---|---|---|
| 5,287,194 A | * | 2/1994 | Lobiondo | 358/296 |
| 5,559,933 A | * | 9/1996 | Boswell | 358/1.15 |
| 5,625,757 A | * | 4/1997 | Kageyama et al. | 358/1.14 |
| 5,828,817 A | * | 10/1998 | Landau | 358/1.13 |
| 5,978,563 A | * | 11/1999 | Kawamoto et al. | 358/1.17 |
| 5,987,226 A | * | 11/1999 | Ishikawa et al. | 358/1.13 |
| 6,188,490 B1 | * | 2/2001 | Miyake | 358/1.18 |
| 6,369,909 B1 | * | 4/2002 | Shima | 358/1.15 |
| 6,379,742 B1 | * | 4/2002 | Behm et al. | 427/7 |
| 6,476,927 B1 | * | 11/2002 | Schwarz, Jr. | 358/1.15 |
| 6,501,562 B1 | * | 12/2002 | Nakagiri et al. | 358/1.2 |
| 6,509,974 B1 | * | 1/2003 | Hansen | 358/1.12 |

FOREIGN PATENT DOCUMENTS

| | | | | |
|---|---|---|---|---|
| JP | 08-016344 | * | 1/1996 | G06F/3/12 |
| JP | 2002-215352 | * | 1/2003 | G06F/3/12 |

* cited by examiner

*Primary Examiner*—Andrew H. Hirshfeld
*Assistant Examiner*—Wasseem H. Hamdan
(74) *Attorney, Agent, or Firm*—Fitzpatrick, Cella, Harper & Scinto

(57) ABSTRACT

When one print job is distributed and printed by a plurality of printing apparatuses, it is intended that a desired print result of the user can be certainly obtained. A virtual distribution printer 12 detects an attribute of the print job which is inputted from an application 11, sets the minimum division unit, in accordance with the detected attribute, in which even if the inputted print job is divided, the print result is not changed, divides the print job on the basis of the minimum division unit, and distributes and outputs the divided print jobs to a plurality of printers 13 to 16, thereby enabling the print result expected by the user to be certainly obtained.

21 Claims, 6 Drawing Sheets

|  SETTING OF DISTRIBUTING ALGORITHM | |
| --- | --- |
| OUTPUT DESTINATION PRINTER | RATE |
| PRINTER A | 30% |
| PRINTER B | 70% |

PRINT CONTROL OF A PRINT JOB TO BE PRINTED TO A PLURALITY OF PRINTERS

BACKGROUND OF THE INVENTION

1. Field of the Invention

The invention relates to a print control apparatus, a printing method, and a print control program and, more particularly, to a mechanism suitable to a case of executing partial printing in each printing apparatus such that on the basis of one print request, the print request is distributed to the printing apparatuses such as a plurality of printers, copying apparatus having a printer function, or the like, another printing apparatus is allowed to execute substitute printing in the middle of the printing, or the like.

2. Related Background Art

Hitherto, there is a distribution print system in which a plurality of print jobs which are generated on the basis of one print request which needs printing of a plurality of pages or a plurality of copies are distributed to a plurality of printers connected to a network or an apparatus such as a copying apparatus having a printer function, or the like (those apparatuses are also called "printers" hereinbelow) and the printing is executed. By using such a distribution print system, printing of a large quantity of documents comprising a plurality of pages can be executed at a high speed.

However, in the conventional distribution print system, when one print job is divided into a plurality of distribution jobs, an attribute of the print job set by the user is not considered, so that there is a case where a print result is different from a print result which is required by the user.

For example, in the case where a duplex printing mode is designated as an attribute of the print job and the user intends to print by a plurality of printers by dividing print data every page, if a dividing position of the print job is set to the even-number designated page, a combination of the pages which are printed to the obverse and the reverse is deviated after the dividing position and the print result is different from a result which is expected by the user. Specifically speaking, if a document is equivalently distributed to three printing apparatuses although the user wants to print the document of 9 pages in the duplex printing mode, the document is transmitted to the three printing apparatuses as a duplex print instruction as a document divided to every three pages. Therefore, in each printing apparatus, two sheets of recording paper are delivered, the second reverse is printed as blank paper, and the print result is different from a result which is expected by the user.

There is a problem such that in the case where a staple printing mode to bind the paper of a plurality of pages and print is designated in the print job, the user ought to expect that the paper is stapled every copy and outputted; however, if the document is divided every page and printed by a plurality of printers, the paper is stapled in the middle of the document, and the print result is different from a result which is expected by the user.

SUMMARY OF THE INVENTION

The invention is made in consideration of the above problems and it is an object of the invention that when one print job is distributed by a plurality of printing apparatuses and printing is performed, by controlling a dividing position of the print job in accordance with an attribute set into the print job, a print result which is expected by the user can be certainly obtained.

According to the invention, there is provided a distribution print control apparatus for controlling in a manner such that a plurality of print jobs are generated on the basis of one print request and distribution-printed by using a plurality of printing apparatuses, characterized by comprising: attribute obtaining means for obtaining a print attribute set for the print request; minimum division unit setting means for setting a minimum division unit of the print request on the basis of the print attribute obtained by the attribute obtaining means; and dividing position deciding means for deciding a dividing position of the plurality of print jobs on the basis of the minimum division unit set by the minimum division unit setting means.

According to another feature of the invention, the apparatus further has print job generating means for generating the plurality of print jobs by dividing at the dividing position which is decided by the dividing position deciding means.

According to still another feature of the invention, if a fact that a staple printing mode to bind paper of a plurality of pages and print has been set as a print attribute of the print request is obtained by the attribute obtaining means, the minimum division unit setting means sets a part of the print request as a minimum division unit.

According to still another feature of the invention, the apparatus further has repetition discriminating means for discriminating whether data is constructed by repetitively arranging data of one copy or not in the case where a fact that a plurality of copies are printed has been set as a print attribute of the print request is obtained by the attribute obtaining means, and if it is determined by the repetition discriminating means that the data is constructed by repetitively arranging the data of one copy, the minimum division unit setting means sets the number of pages of one copy as a minimum division unit so as to set one copy to the minimum division unit.

According to still another feature of the invention, if a fact that a duplex printing mode has been set as a print attribute of the print request is obtained by the attribute obtaining means, the minimum division unit setting means sets two physical pages as a minimum division unit.

According to still another feature of the invention, if a fact that an Nup (pages-in-one) printing mode to print a plurality of logical pages to one physical page has been set as a print attribute of the print request is obtained by the attribute obtaining means, the minimum division unit setting means sets the number of logical pages which are printed to the one physical page as a minimum division unit.

According to still another feature of the invention, if a fact that both of a duplex printing mode and an Nup printing mode to print a plurality of logical pages to the one physical page have been set as a print attribute of the print request is obtained by the attribute obtaining means, the minimum division unit setting means sets the number of pages which is twice as large as the number of logical pages which are printed to the one physical page as a minimum division unit.

A distribution print system of the invention has the distribution print control apparatus disclosed in one of the above paragraphs and a plurality of printing apparatuses.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Preferred embodiments of a distribution print control apparatus, a distribution print system, a distribution printing method, a computer-readable recording medium, and a computer program of the invention will be described in detail hereinbelow.

Figure 1:
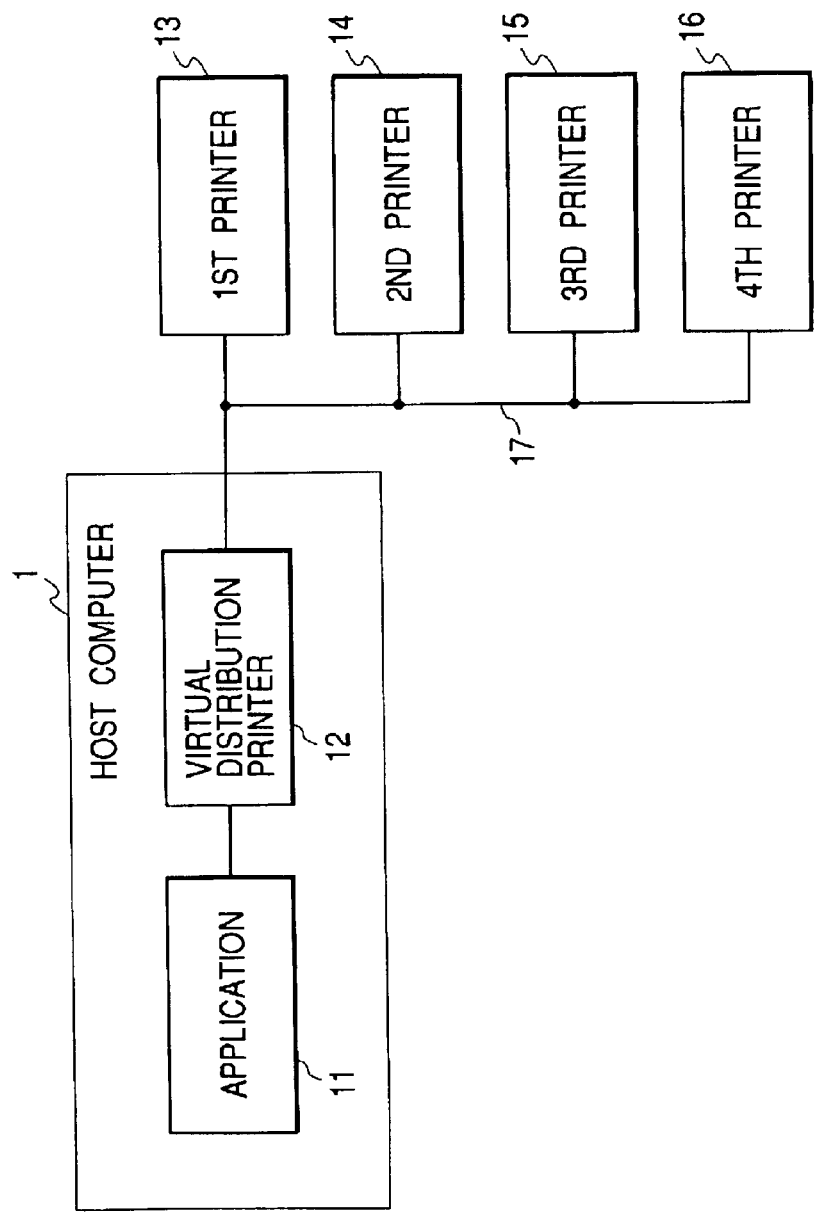
FIG. 1 is a block diagram showing an embodiment of a distribution print system of the invention.

FIG. 1 is a block diagram showing a constructional example of the distribution print system in the embodiment. In FIG. 1, reference numeral 1 denotes a host computer. The distribution print control apparatus of the embodiment is constructed by the host computer 1. Reference numeral 11 denotes an application program (hereinafter, referred to as an application) to print, and 12 indicates a virtual distribution printer module (hereinafter, referred to as a virtual distribution printer) which receives a print request from the application 11.

A substance of the virtual distribution printer 12 includes: each of printer drivers corresponding to physical printers (first to fourth printers) 13 to 16 serving as printing apparatuses; and a distributing module for distributing processes to each printer driver. Each printer to be distributed can be preliminarily set by the administrator, user, or the like or can be also set by the user each time the print request is issued.

Specifically speaking, the first printer 13 to the fourth printer 16 comprise, for example, a color printer for performing color printing, a monochromatic printer for performing monochromatic printing, a copying apparatus having a printer function and the like. As kinds of color printers, for example, a color laser printer, an ink-jet printer, an LED printer, etc. can be mentioned.

The host computer 1 and the first to fourth printers 13 to 16 are connected via a network 17 as a communication medium.

In the host computer 1 with the above construction provided on the system, by transferring a file in an intermediate file format such as a metafile or the like from the application 11 to the virtual distribution printer 12, a specific page can be extracted from the intermediate files. Various methods can be applied as countermeasures when a fault occurs in the printer. The virtual distribution printer 12 is a module which operates on the host computer and is selected as an output destination when a print instruction is issued from the application 11. Hitherto, although the application 11 has selected the printer driver as an output destination, the virtual distribution printer 12 is selected in the embodiment. Here, the virtual distribution printer 12 can use the printer driver (not shown) corresponding to each of the first to fourth printers 13 to 16.

The application 11 designates the virtual distribution printer 12 as a printer on the print destination side and executes the printing, so that the virtual distribution printer 12 executes, as necessary, processes such that the intermediate files which are formed on the basis of output data from the application 11 are distributed and data in the intermediate file is transferred to each printer driver. Each printer driver forms print data on the basis of the intermediate file (all or a part of the original data) transferred from the virtual distribution printer 12 and distributes the print data to each printer. In this manner, a distribution printing process, which will be explained in the embodiment, is executed.

Although the four printers 13 to 16 have been set as printers on the distribution destination side in the embodiment, the number of printers is not limited to 4.

Although the one host computer 1 has been set in the embodiment, a plurality of host computers can be also used and the number of host computers is not limited to those numbers.

Further, it is not always necessary that the application 11 and virtual distribution printer 12 are implemented in the same apparatus. For example, it is also possible to use a construction such that the virtual distribution printer 12 is implemented on the print server side (not shown) and the application 11 is implemented on the print client side (host computer 1), respectively.

Figure 2:
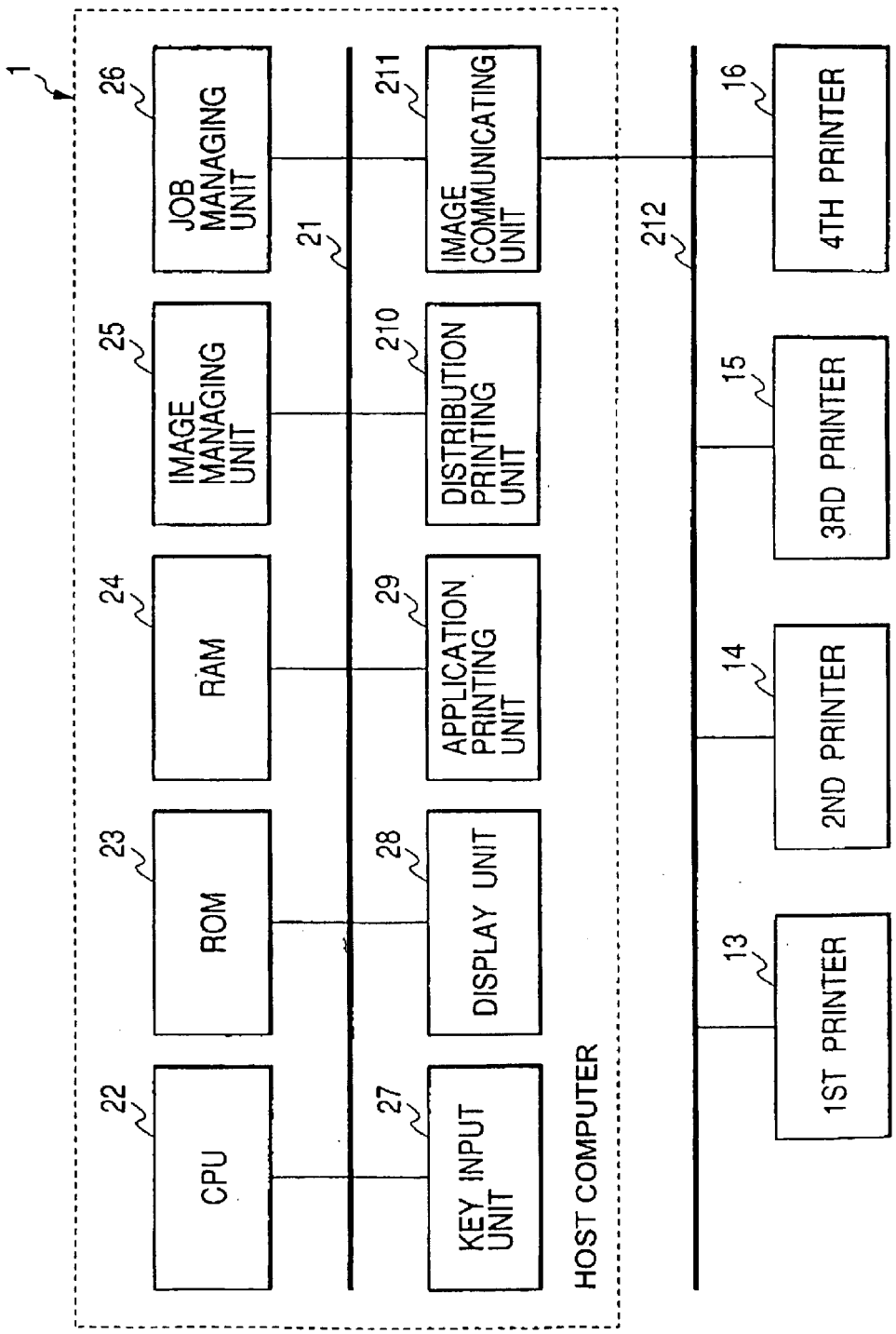
FIG. 2 is an internal block diagram of a host computer of the embodiment.

FIG. 2 is a block diagram for explaining an internal construction of the host computer 1 of the distribution print system in the embodiment. In FIG. 2, reference numeral 21 denotes a system bus; 22 a CPU for controlling the system; 23 an ROM in which control codes which are executed by the CPU 22 have been written; and 24 an RAM.

Reference numeral 25 denotes an image management unit in which the intermediate files in an RAW format, an EMF (Enhanced Meta File) format, or the like have been stored. Reference numeral 26 denotes a job management unit for monitoring a status of each printer which is subjected to the distribution printing process. The job management unit 26 obtains information indicating whether each of the distributed print jobs has normally been printed or not or, if a fault occurred during the printing operation, to which page the printing has been performed. When the fault occurs in the printer, the job management unit 26 notifies a distribution printing unit 210 of the fault.

Reference numeral 27 denotes a key input unit for allowing the user to execute a key operation and 28 indicates a display unit such as a CRT or the like for displaying contents of job management and allowing the user to execute the operation.

Reference numeral 29 denotes an application printing unit and 210 indicates the distribution processing unit. The application printing unit 29 receives the print request from the application 11, transmits the print data to the image management unit 25, and sends the print request to the distribution printing unit 210 if the print request is a request for a distribution print.

When the print request is received from the application printing unit 29, the distribution printing unit 210 outputs a processing request of the print data by distributing the data to the registered printer drivers in accordance with a registered distributing algorithm. At this time, the print data is received by the image management unit 25 and, if necessary, the print data is reconstructed, the reconstructed print data is used and outputted.

Reference numeral 211 denotes an image communicating unit for allowing the host computer 1 to communicate with the printers 13 to 16. The image communicating unit 211 performs a protocol control of the LAN. Reference numeral 212 denotes an LAN line to which the first printer 13, second printer 14, third printer 15, and fourth printer 16 are connected.

When the distribution print request is received from the application printing unit 29, the distribution printing unit 210 determines one of the first to fourth printers 13 to 16 which is used to print.

Figures 3, 4:
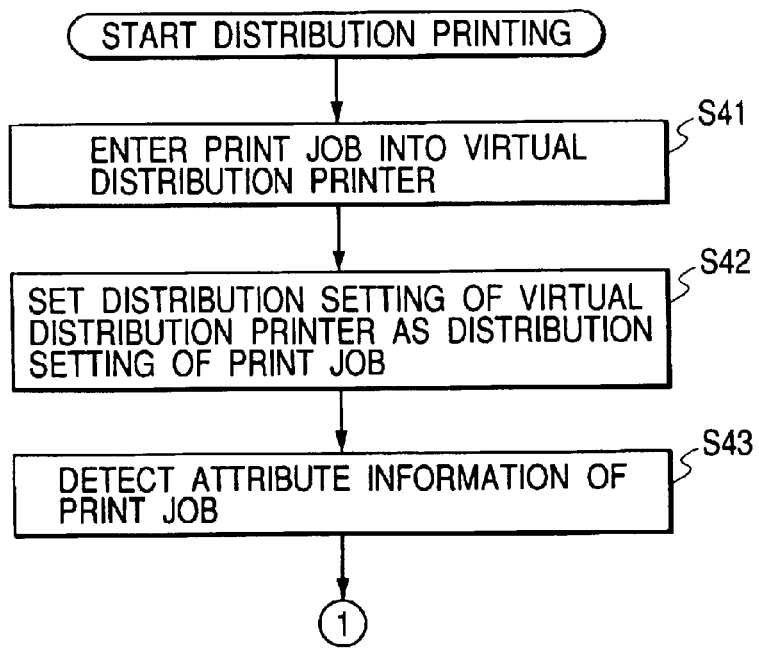
FIG. 3 is a diagram showing an example of a setting picture plane of a distributing algorithm which is displayed in a display unit of the embodiment.
FIG. 4 is an operation flowchart for explaining a distribution printing process of the embodiment.

FIG. 3 is a diagram showing an example of a setting picture plane of the distributing algorithm which is outputted to the display unit 28. This setting picture plane is formed by the virtual distribution printer 12 (distribution printing unit 210). In FIG. 3, reference numeral 31 denotes set items for setting the printers on the distribution destination side and the distribution rates at which the printing is performed by the set printers. Those items can be arbitrarily set by the user.

In the example shown in FIG. 3, a printer A (first printer 13) and a printer B (second printer 14) have been set as printers on the distribution destination side and their print rates have been set to 30% and 70%, respectively.

That is, in this case, the setting is performed in a manner such that, in the print job inputted to the virtual distribution printer 12, the print job of 30% is printed by the first printer 13 and the print job of residual 70% is printed by the second printer 14 (hereinafter, such a setting is referred to as a distribution setting). This set information is held in the distribution printing unit 210.

The distribution print processing operation in the embodiment will now be described. FIGS. 4 to 7 flowcharts for explaining the distribution print processing operation in the embodiment. The operation will be described in detail hereinbelow with reference to the flowcharts.

First, in step S41, when the print request is issued from the application 11 to the virtual distribution printer 12, the application printing unit 29 receives a print data, outputs it to the image management unit 25, and outputs the print request to the distribution printing unit 210.

Subsequently, in step S42, the distribution printing unit 210 sets the distribution setting which has been set into to the virtual distribution printer 12 as a distribution setting of the inputted print job. The distribution setting of the virtual distribution printer 12 are the setting set by the user by using a setting picture plane of a distributing algorithm in FIG. 3.

Subsequently, in step S43, the distribution printing unit 210 detects and obtains attribute information of the print job. A process which is executed in step S43 is performed by attribute obtaining means constructed as a program by a computer system of the host computer 1. The attribute obtaining means (not shown) is a part of the distribution printing unit 210.

In the embodiment, as will be explained hereinlater, the attribute obtaining means detects and obtains the attribute information showing whether one print job is constructed by data in which data constructing one print document comprising a plurality of pages has repetitively been arranged, whether the staple printing mode has been set, whether the duplex printing mode has been set, whether the Nup printing mode has been set, and the like. However, the attribute information of the print job is not limited to them.

The attribute information showing whether one print job is constructed by data in which data constructing one print document has repetitively been arranged is made by repetition discriminating means constructed as a program by the computer system of the host computer 1.

Figure 5:
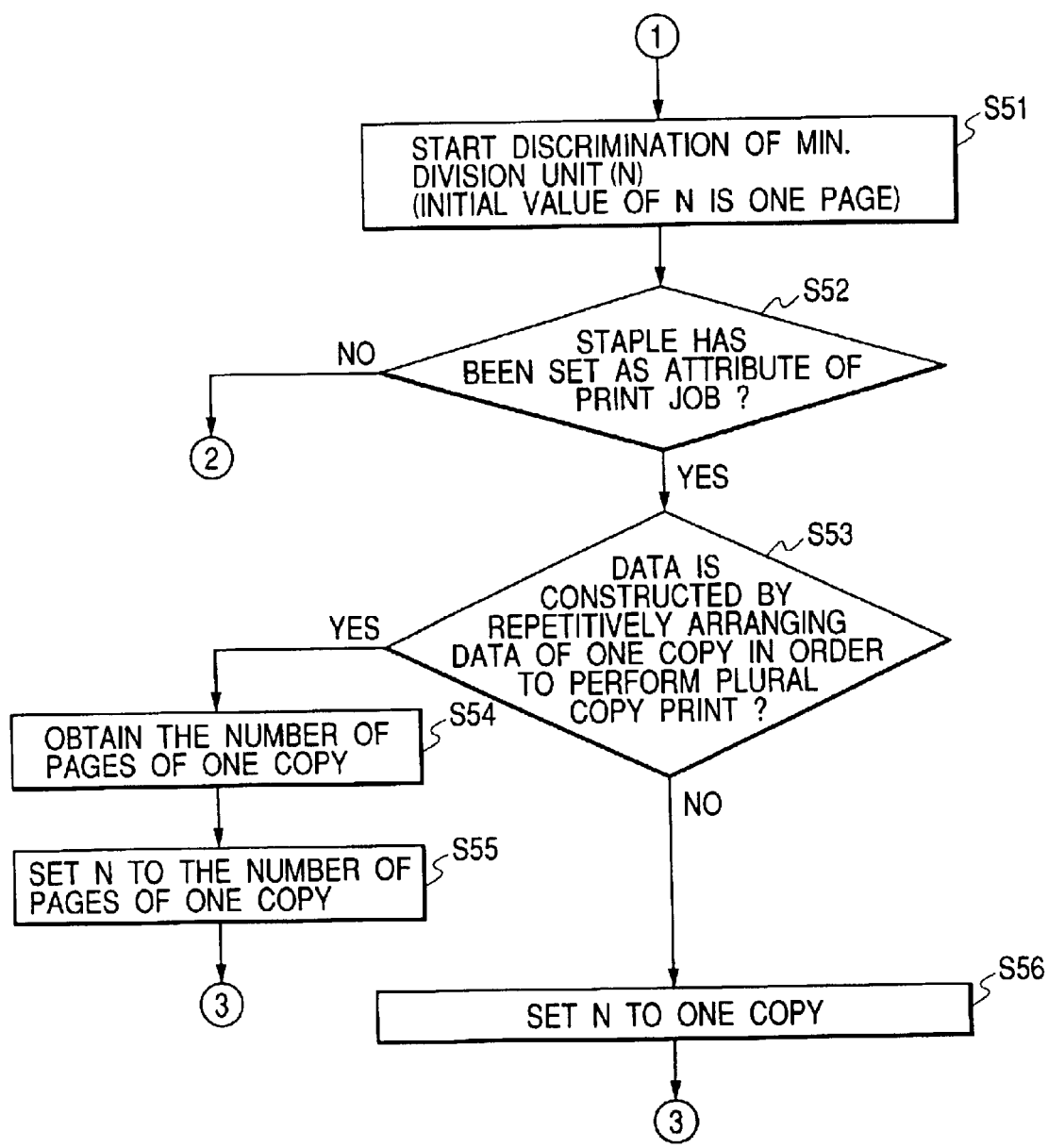
FIG. 5 is an operation flowchart for explaining the distribution printing process of the embodiment and is a sequel to FIG. 4.
Figure 6:
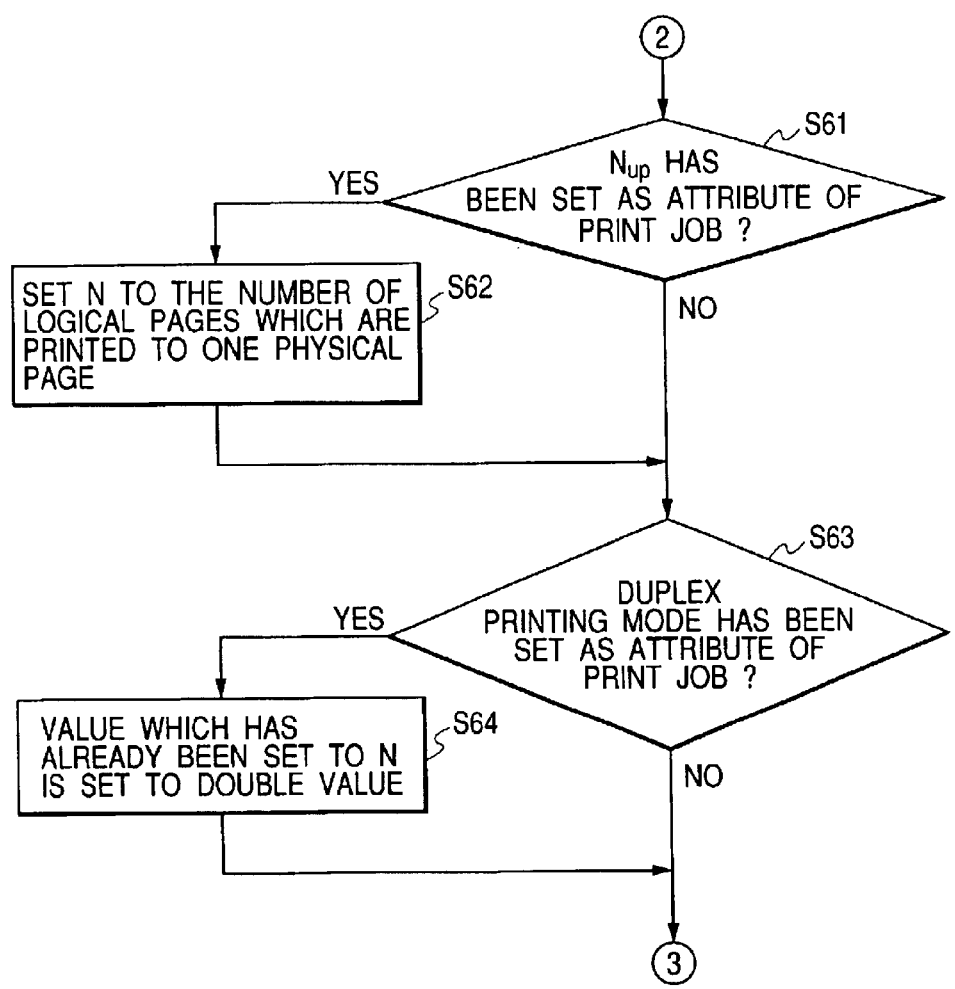
FIG. 6 is an operation flowchart for explaining the distribution printing process of the embodiment and is a sequel to FIG. 5.
Figure 7:
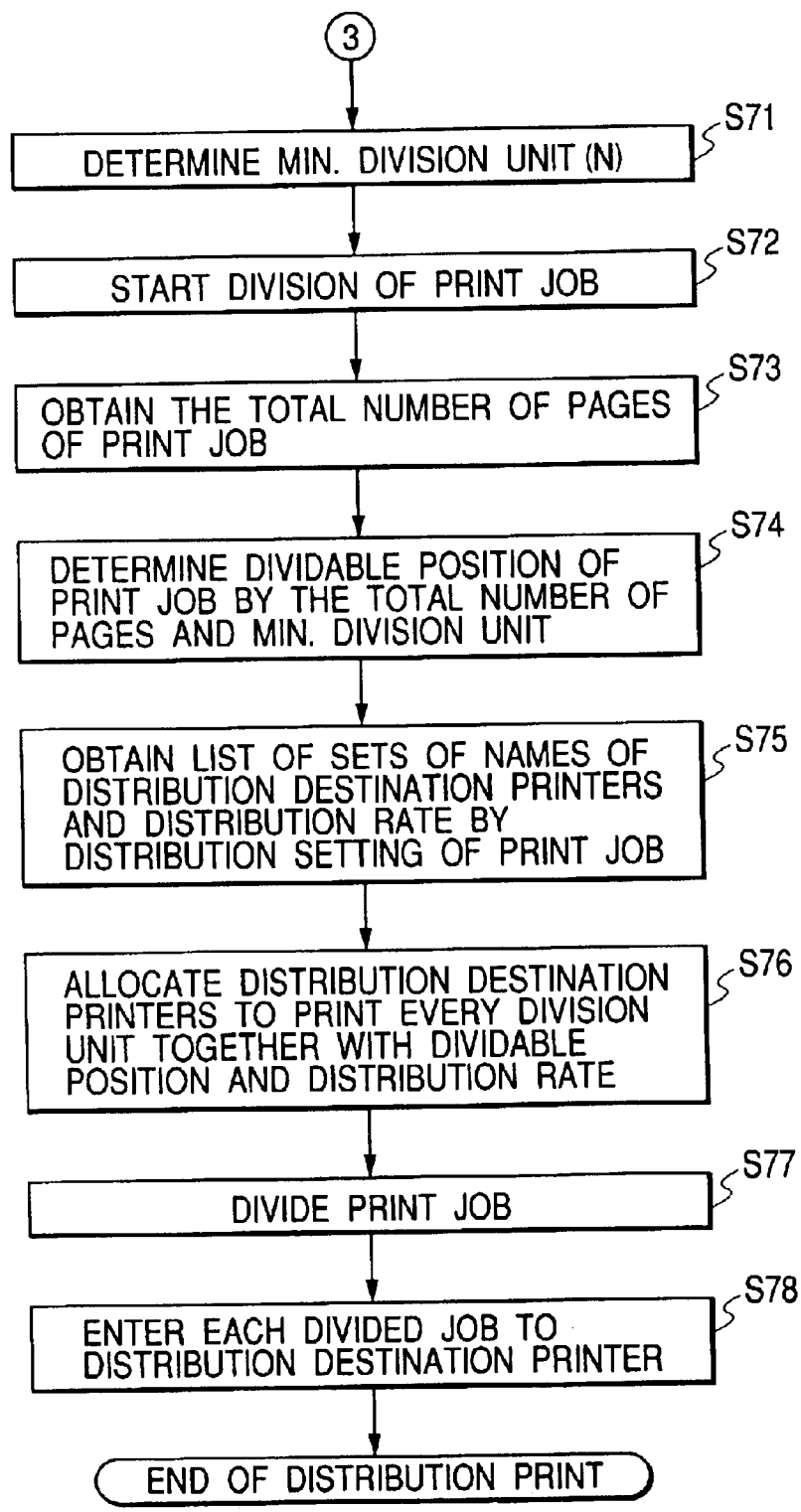
FIG. 7 is an operation flowchart for explaining the distribution printing process of the embodiment and is a sequel to FIG. 6.

Subsequently, as shown in FIG. 5, in step S51, the distribution printing unit 210 starts to discriminate a minimum division unit N. An initial value of the minimum division unit N is set to one page. The minimum division unit N can express not only the number of pages but also, for example, the number of copies.

Subsequently, in step S52, the distribution printing unit 210 discriminates whether the staple printing mode has been set as an attribute of the print job or not. As a result of the discrimination, if the staple printing mode has been set, step S53 follows. If it is not set, the processing routine advances to step S61 shown in FIG. 6.

Subsequently, in step S53, on the basis of the attribute of the print job detected by the process in step S43, the distribution printing unit 210 discriminates whether one print job has been constructed by the data in which data constructing one print document comprising a plurality of pages has repetitively been arranged in order to execute plural-copy printing or not. As a result of the discrimination, if it is determined that one print job is constructed by the data in which the data has repetitively been arranged, step S54 follows. If NO, step S56 follows. The process which is executed in step S53 is performed by the repetition discriminating means constructed as a program by the computer system of the host computer 1.

In step S54, since the print job includes the data of a plurality of copies, the distribution printing unit 210 obtains the number of pages of one copy in order to divide the job on a copy unit basis.

Subsequently, in step S55, the minimum division unit N is set to the number of pages of one copy obtained by the process in step S54. As mentioned above, the process which is executed in step S55 is performed by minimum division unit setting means constructed as a program by the computer system of the host computer 1.

As a result of the discrimination in step S53, if it is determined that the print job is not the data in which the data of one copy has repetitively been arranged, step S56 follows.

In step S56, since the staple printing mode has been set to the print job, the minimum division unit N is set to one copy in order to prevent a situation such that the job is divided in the middle of the data of one copy and the stapling process cannot be performed every copy. The processes which are executed in steps S52 to S56 are performed by division unit setting means (a part of the distribution printing unit 210) constructed as a program by the computer system of the host computer 1. The process which is executed in step S56 is performed by the minimum division unit setting means constructed as a program by the computer system of the host computer 1.

As mentioned above, if the staple printing mode has been set and, further, the data of a plurality of copies is the data in which the data has repetitively been arranged in the plural copy printing mode, the minimum division unit is set to the number of pages of one copy. If the data of a plurality of copies is not the data in which the data has repetitively been arranged in the plural copy printing mode, the minimum division unit is set to one copy.

In step S52, if it is determined by the distribution printing unit 210 that the staple printing mode is not set to the print job, step S61 follows. In this case, since the staple printing mode is not set, it is decided that the print job can be divided even between the pages of the same copy.

In step S61, the distribution printing unit 210 discriminates whether the pages-in-one printing mode called an Nup (Number-up) printing mode has been set as an attribute of the print job or not. "Nup" denotes the setting such that pages which are outputted from the application (hereinafter, they are called logical pages) are reduced and the data of N logical pages is reduced and arranged onto one sheet of paper (hereinafter, referred to as a physical page). As a result of the discrimination, if it is decided that Nup has been set, step S62 follows. If it is not set, the minimum division unit (N) is set to "1" and step S63 follows.

In step S62, the minimum division unit N is set to the number of logical pages which are printed to one physical page. Specifically speaking, for example, if "2in1" printing mode (the printing mode in which two logical pages are reduction-arranged to one physical page; this printing mode is also called "2up") has been set as an attribute of the print job, the minimum division unit is set to "2". If "4in1" printing mode (the printing mode in which four logical pages are reduction-arranged to one physical page; this printing mode is also called "4up") has been set as an attribute of the print job, the minimum division unit is set to "4". This is because, for example, when the "2in1" printing mode is set, if the print job is divided at the even-number designated page, a combination of the logical pages which are printed to the physical page is deviated after the dividing position and the print result is different from a result which is expected by the user. After completion of the setting process, step S63 follows.

The process which is executed in step S62 is performed by the minimum division unit setting means constructed as a program by the computer system of the host computer 1. The processes which are executed in steps S61 and S62 are performed by the division unit discriminating means (a part of the distribution printing unit 210) constructed as a program by the computer system of the host computer 1. As mentioned above, if the staple printing mode is not instructed, whether the Nup printing mode has been set or not is discriminated. If the Nup printing mode has been set, by setting the number of logical pages which are printed to one physical page to the minimum division unit, a dividing process in which the pages are preferably aligned can be performed.

In step S63, the distribution printing unit 210 discriminates whether the duplex printing mode has been set as an attribute of the print job or not. As a result of the discrimination, if it is decided that the duplex printing mode has been set, step S64 follows. If NO, the processing routine advances to step S71 shown in FIG. 7.

In step S64, the distribution printing unit 210 sets the minimum division unit N to a value which is twice as large as the value which has already been set to N. This is because when the duplex printing mode has been set, if the print job is divided at the even-number designated page in the physical pages, a combination of the pages of the obverse and the reverse which are printed to one sheet of paper is deviated after the dividing position and the print result is different from a result which is expected by the user. Step S71 follows.

As mentioned above, the process which is executed in step S64 is performed by the minimum division unit setting means constructed as a program by the computer system of the host computer 1. The processes which are executed in steps S63 and S64 are performed by the division unit discriminating means constructed as a program by the computer system of the host computer 1.

In step S71, the distribution printing unit 210 executes the process for deciding the minimum division unit N. In step S72, the distribution printing unit 210 executes the process for starting the division of draw data according to the print request from the application 11. Subsequently, in step S73, the distribution printing unit 210 obtains the total number of pages of the draw data from the application 11. The dividable position of the draw data is decided in step S74 on the basis of the total number of pages and the minimum division unit.

As mentioned above, the process which is executed in step S74 is performed by the dividing position deciding means constructed as a program by the computer system of the host computer 1.

Subsequently, in step S75, the distribution printing unit 210 obtains list information of sets of the information regarding the printers 13 and 14 on the distribution destination side and the distribution rates on the basis of the distribution setting set to the print job. This information is information which has been set by a setting picture plane 31 of the distributing algorithm shown in FIG. 3.

Subsequently, in step S76, the distribution printing unit 210 allocates the distribution destination printers 13 to 16 to which the job is inputted and which perform the printing on a division unit basis on the basis of the dividable position and the distribution rates. Step S77 follows and the print job is divided into a plurality of jobs on the basis of the print request which is issued from the application. That is, the virtual distribution printer 12 holds a draw command which is outputted from the application 11 via a drawing unit (not shown) of the OS as an intermediate file such as a metafile or the like, extracts it on a logical page unit basis, and allocates it to a plurality of printer drivers to be distributed, thereby generating a plurality of print jobs. The process which is executed in step S77 is performed by print job generating means (a part of the distribution printing unit 210) constructed as a program by the computer system of the host computer 1.

Finally, in step S78, each of the divided and generated print jobs is inputted to the designated distribution destination printers 13 and 14 via the image communicating unit 211. The process which is executed in step S78 is performed by print job output means constructed as a program by the computer system of the host computer 1.

In the embodiment, as mentioned above, the inputted print job is read out and the attribute of the print job regarding whether the data of a plurality of copies is included in the print job or not, whether the staple printing mode has been designated or not, whether the Nup printing mode has been designated or not, and the like are detected. The dividable position of the print job is determined on the basis of the minimum division unit N according to the detected attribute. Thus, for example, an inconvenience such that the paper is stapled in the middle of the document or the combination of the pages which are printed to the obverse and the reverse is deviated can be prevented. The same print result as that expected and set by the user can be certainly obtained.

When one print job is constructed by the data in which the data has repetitively been arranged a plurality of number of times, one unit of the repetitive data, that is, the number of pages of one copy is set to the minimum division unit. Therefore, when a print document of a plurality of copies is outputted, the same print result as that expected and set by the user can be certainly obtained.

Further, since the printers on the distribution destination side and the print rates at which the print data is printed by those printers are set on the setting picture plane of the distributing algorithm, for example, it is possible to avoid the printer whose operating efficiency is high and perform the distribution printing. A plurality of printers 13 to 16 can be more efficiently made operative.

Although the print job has been divided on the minimum division unit basis in the embodiment, if it can be divided so that the same print result as that expected and set by the user can be obtained even if one print job is divided, it is not always necessary to divide the print job to the minimum division unit.

(Other Embodiments of the Invention)

The invention also incorporates a case where in order to make various devices operative so as to realize the functions of the embodiment mentioned above, program codes of software to realize the functions of the embodiment mentioned above are supplied to a computer in an apparatus or a system connected to the various devices and the various devices are made operative in accordance with a program stored in the computer (a CPU or an MPU) of the system or apparatus, thereby embodying the invention.

In this case, the program codes themselves of the software realize the functions of the embodiment mentioned above. The program codes themselves and means for supplying the program codes to a computer, for example, a recording medium in which the program codes have been stored construct the invention. As a recording medium for storing the program codes, for example, a flexible disk, a hard disk, an optical disk, a magnetooptic disk, a CD-ROM, a CD-R, a CD-RW, a DVD, a magnetic tape, a nonvolatile memory card, an ROM, or the like can be used.

The program codes are naturally incorporated in the embodiment of the invention in not only a case where a computer executes the supplied program codes, so that the functions of the embodiment mentioned above are realized but also a case where the program codes cooperate with an OS (Operating System) which is operating in the computer or another application software or the like, so that the functions of the embodiment mentioned above are realized.

Naturally, the invention also incorporates a case where the supplied program codes are stored into a memory equipped for a function expanding board of a computer or a function expanding unit connected to a computer, and thereafter, on the basis of instructions of the program codes, a CPU or the like equipped for the function expanding board or function expanding unit executes a part or all of actual processes, and the functions of the embodiment mentioned above are realized by those processes.

As many apparently widely different embodiments of the present invention can be made without departing from the spirit and scope thereof, it is to be understood that the invention is not limited to the specific embodiments thereof except as defined in the appended claims.

As mentioned above, according to the invention, when one print job is distributed and printed by a plurality of printing apparatuses, by controlling the dividing position of the print job in accordance with the attribute set to the print job, the same print result as that expected and set by the user can be certainly obtained.

According to another feature of the invention, when one print job is constructed by the data which has repetitively been arranged a plurality of number of times, one unit of the repetitive data, that is, the number of pages of one print document comprising a plurality of pages has been set to the minimum division unit. Therefore, when the print document comprising a plurality of copies is outputted, the same print result as that expected and set by the user can be certainly obtained.

What is claimed is:

1. A print control apparatus for controlling a printing operation in a manner such that a plurality of print jobs are generated on the basis of one print request and printed by using a plurality of printing apparatuses, comprising:

attribute obtaining means for obtaining a print attribute set for said print request;

minimum division unit setting means for selecting a minimum division unit from among a plurality of division units based on the print attribute obtained by said attribute obtaining means, and for setting a minimum division unit of said print request on the basis of the selected minimum division unit; and dividing position deciding means for deciding a dividing position of a plurality of print jobs on the basis of the minimum division unit set by said minimum division unit setting means.

2. An apparatus according to claim 1, further comprising print job generating means for generating a plurality of print jobs by dividing at the dividing position which is decided by said dividing position deciding means.

3. An apparatus according to claim 2, wherein if a staple printing mode to bind paper of a plurality of pages and print has been set as the print attribute of said print request obtained by said attribute obtaining means, said minimum division unit setting means sets a part of said print request as said minimum division unit.

4. An apparatus according to claim 2, further comprising repetition discriminating means for discriminating whether data is to be constructed by repetitively arranging data of one copy or not in the case where a plurality of copies are to be printed has been set as the print attribute of said print request obtained by said attribute obtaining means, and wherein if it is determined by said repetition discriminating means that the data is to be constructed by repetitively arranging the data of one copy, said minimum division unit setting means sets the number of pages of one copy as the minimum division unit so as to set one copy to said minimum division unit.

5. Apparatus according to claim 2, wherein if a duplex printing mode has been set as the print attribute of said print request obtained by said attribute obtaining means, said minimum division unit setting means sets two physical pages as said minimum division unit.

6. An apparatus according to claim 2, wherein if an $N_{up}$ printing mode to print a plurality of logical pages to one physical page has been set as the print attribute of said print request obtained by said attribute obtaining means, said minimum division unit setting means sets the number of logical pages which are to be printed to said one physical page as said minimum division unit.

7. An apparatus according to claim 2, wherein if both of a duplex printing mode and an $N_{up}$ printing mode to print a plurality of logical pages to one physical page have been set as the print attribute of said print request obtained by said attribute obtaining means, said minimum division unit setting means sets the number of pages which is twice as large as the number of logical pages which are to be printed to said one physical page as said minimum division unit.

8. A print control method of controlling a printing operation in a manner such that a plurality of print jobs are generated on the basis of one print request and printed by using a plurality of printing apparatuses, comprising the steps of:

an attribute obtaining step of obtaining a print attribute set for said print request;

a minimum division unit setting step of setting a minimum division unit of said print request on the basis of the print attribute obtained by said attribute obtaining step, the minimum division unit being selected from among a plurality of division units based on the print attribute; and a dividing position deciding step of deciding a dividing position of a plurality of print jobs on the basis of the minimum division unit set by said minimum division unit setting step.

9. A method according to claim 8, further comprising a print job generating step of generating a plurality of print jobs by dividing at the dividing position which is decided by said dividing position deciding step.

10. A method according to claim 9, wherein if a staple printing mode to bind paper of a plurality of pages and print has been set as the print attribute of said print request obtained by said attribute obtaining step, in said minimum division unit setting step, a part of said print request is set as said minimum division unit.

11. A method according to claim 9, further comprising a repetition discriminating step of discriminating whether data is to be constructed by repetitively arranging data of one copy or not in the case where a plurality of copies are to be printed has been set as the print attribute of said print request obtained by said attribute obtaining step, and wherein if it is determined by said repetition discriminating step that the data is to be constructed by repetitively arranging the data of one copy, in said minimum division unit setting step, the number of pages of one copy is set as the minimum division unit so as to set one copy to said minimum division unit.

12. A method according to claim 9, wherein if a duplex printing mode has been set as the print attribute of said print request obtained by said attribute obtaining step, in said minimum division unit setting step, two physical pages are set as said minimum division unit.

13. A method according to claim 9, wherein if an $N_{up}$ printing mode to print a plurality of logical pages to one physical page has been set as the print attribute of said print request obtained by said attribute obtaining step, in said minimum division unit setting step, the number of logical pages which are printed to said one physical page is set as said minimum division unit.

14. A method according to claim 9, wherein if both of a duplex printing mode and an $N_{up}$ printing mode to print a plurality of logical pages to one physical page have been set as the print attribute of said print request obtained by said attribute obtaining step, in said minimum division unit setting step, the number of pages which is twice as large as the number of logical pages which are printed to said one physical page is set as said minimum division unit.

15. A print control program for controlling a printing operation in a manner such that a plurality of print jobs are generated on the basis of one print request and printed by using a plurality of printing apparatuses, the program comprising the steps of:

an attribute obtaining step of obtaining a print attribute set for said print request;

a minimum division unit setting step of setting a minimum division unit of said print request on the basis of the print attribute obtained by said attribute obtaining step, the minimum division unit being selected from among a plurality of division units based on the print attribute; and a dividing position deciding step of deciding a dividing position of a plurality of print jobs on the basis of the minimum division unit set by said minimum division unit setting step.

16. A program according to claim 15, further comprising a print job generating step of generating a plurality of print jobs by dividing at the dividing position which is decided by said dividing position deciding step.

17. A program according to claim 16, wherein if a staple printing mode to bind paper of a plurality of pages and print has been set as the print attribute of said print request obtained by said attribute obtaining step, in said minimum division unit setting step, a part of said print request is set as said minimum division unit.

18. A program according to claim 16, further comprising a repetition discriminating step of discriminating whether data is to be constructed by repetitively arranging data of one copy or not in the case where a plurality of copies are to be printed has been set as the print attribute of said print request obtained by said attribute obtaining step, and wherein if it is determined by said repetition discriminating step that the data is to be constructed by repetitively arranging the data of one copy, in said minimum division unit setting step, the number of pages of one copy is set as the minimum division unit so as to set one copy to said minimum division unit.

19. A program according to claim 16, wherein if a duplex printing mode has been set as the print attribute of said print request obtained by said attribute obtaining step, in said minimum division unit setting step, two physical pages are set as said minimum division unit.

20. A program according to claim 16, wherein if an $N_{up}$ printing mode to print a plurality of logical pages to one physical page has been set as the print attribute of said print request obtained by said attribute obtaining step, in said minimum division unit setting step, the number of logical pages which are printed to said one physical page is set as said minimum division unit.

21. A program according to claim 16, wherein if both of a duplex printing mode and an $N_{up}$ printing mode to print a plurality of logical pages to one physical page have been set as the print attribute of said print request obtained by said attribute obtaining step, in said minimum division unit setting step, the number of pages which is twice as large as the number of logical pages which are printed to said one physical page is set as said minimum division unit.

* * * * *

UNITED STATES PATENT AND TRADEMARK OFFICE
CERTIFICATE OF CORRECTION

PATENT NO. : 6,783,288 B2
DATED : August 31, 2004
INVENTOR(S) : Kato

It is certified that error appears in the above-identified patent and that said Letters Patent is hereby corrected as shown below:

Column 5,
Line 31, "4 to 7" should read -- 4 to 7 are --;
Line 41, "to" should be deleted; and
Line 44, "are" should read -- is --.

Column 6,
Line 43, "every" should read -- for every --.

Column 10,
Line 37, "Apparatus" should read -- An apparatus --.

Signed and Sealed this

Eighth Day of February, 2005

JON W. DUDAS
*Director of the United States Patent and Trademark Office*